(12) United States Patent
Kurosaki et al.

(10) Patent No.: US 7,537,812 B2
(45) Date of Patent: May 26, 2009

(54) ALIGNING AGENT FOR LIQUID CRYSTAL AND LIQUID-CRYSTAL ALIGNMENT FILM OBTAINED WITH THE SAME

(75) Inventors: Mariko Kurosaki, Chiba (JP); Go Ono, Chiba (JP); Kio Mizuno, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 380 days.

(21) Appl. No.: 10/545,268

(22) PCT Filed: Feb. 10, 2004

(86) PCT No.: PCT/JP2004/001362

§ 371 (c)(1), (2), (4) Date: Jun. 6, 2006

(87) PCT Pub. No.: WO2004/072719

PCT Pub. Date: Aug. 26, 2004

(65) Prior Publication Data

US 2007/0036915 A1    Feb. 15, 2007

(30) Foreign Application Priority Data

Feb. 12, 2003    (JP) .............................. 2003-033096

(51) Int. Cl.
*C09K 19/56* (2006.01)
*G02F 1/1337* (2006.01)

(52) U.S. Cl. ...................... 428/1.2; 428/1.25; 428/1.26; 252/299.4; 349/127

(58) Field of Classification Search .............. 252/299.4; 428/1.2, 1.25, 1.26; 349/127
See application file for complete search history.

(56) References Cited

U.S. PATENT DOCUMENTS

| 5,698,135 | A |   | 12/1997 | Nishikawa et al. |         |
|-----------|---|---|---------|------------------|---------|
| 5,700,860 | A | * | 12/1997 | Nishikawa et al. | 524/317 |
| 5,783,656 | A |   | 7/1998  | Kimura et al.    |         |
| 6,413,686 | B2|   | 7/2002  | Kishimoto et al. |         |
| 7,122,226 | B2| * | 10/2006 | Shimizu et al.   | 428/1.1 |

FOREIGN PATENT DOCUMENTS

| JP | 6-34979    | 2/1994 |
| JP | 7-109438   | 4/1995 |
| JP | 8-208983   | 8/1996 |
| JP | 10-253965  | 9/1998 |
| JP | 2001-115019| 4/2001 |

\* cited by examiner

*Primary Examiner*—Shean C Wu
(74) *Attorney, Agent, or Firm*—Oblon, Spivak, McClelland, Maier & Neustadt, P.C.

(57) ABSTRACT

To provide a liquid crystal aligning agent which gives a coating film with good uniformity regardless of drying temperature after coating, and a liquid crystal alignment film having good coating film uniformity.

A liquid crystal aligning agent comprising at least one polymer selected from a polyamic acid and a soluble polyimide, diethylene glycol diethyl ether, and dipropylene glycol monomethyl ether, and a liquid crystal alignment film obtained by printing this liquid crystal aligning agent by a flexographic printing method.

21 Claims, No Drawings

ALIGNING AGENT FOR LIQUID CRYSTAL AND LIQUID-CRYSTAL ALIGNMENT FILM OBTAINED WITH THE SAME

TECHNICAL FIELD

The present invention relates to a liquid crystal aligning agent to be used for a liquid crystal display device, and a liquid crystal alignment film employing it. Particularly, it relates to a liquid crystal aligning agent which gives a coating film with good uniformity even when the drying temperature changes during formation of the coating film, and a liquid crystal alignment film employing it.

BACKGROUND ART

Liquid crystal display devices are presently widely used in e.g. displays of personal computers or televisions as display devices which can realize thin structure/light weight. In such liquid crystal display devices, liquid crystal alignment films of a polyamic acid or a polyimide are commonly used in many cases.

Such a liquid crystal alignment film is usually formed by applying a liquid crystal aligning agent having a polyamic acid or a polyimide dissolved in an organic solvent, on a substrate by e.g. flexographic printing, followed by preliminary drying and baking. In such a case, it is undesirable that a coating film of the liquid crystal aligning agent has a partial film thickness irregularity, since such an irregularity may present an adverse effect to the display characteristics of a liquid crystal display device.

When a liquid crystal alignment film is to be formed, selection of the solvent to be used for the liquid crystal aligning agent becomes important in order to form the coating film uniformly without irregularity. As such a solvent, it is common to employ a solvent excellent in the solubility of a polyamic acid or a polyimide in combination with a solvent such as butyl cellosolve. Further, it is known that also in a case where dipropylene glycol monomethyl ether is employed instead of butyl cellosolve, it is possible to obtain a smooth coating film free from irregularities (JP-A-7-109438). Likewise, it is known that also in a case where diethylene glycol diethyl ether is mixed, cissing or coating film thickness irregularity can be reduced (JP-A-8-208983).

Such a liquid crystal aligning agent is, after being applied on a substrate, usually subjected to preliminary drying at a temperature of at least 80° C. Along with the trend for a large size and low costs of liquid crystal display devices in recent years, there is a situation where the preliminary drying of the liquid crystal aligning agent is carried out at a temperature lower than before. However, with a conventional liquid crystal aligning agent, a uniform coating film tends to be hardly formed by drying at such a low temperature, and it has been desired to develop a liquid crystal aligning agent whereby a uniform coating film can be obtained regardless of the temperature for preliminary drying.

DISCLOSURE OF THE INVENTION

The present invention has been made under such a circumstance, and it is an object of the present invention to provide a liquid crystal aligning agent which gives a coating film with good uniformity regardless of the drying temperature after coating, and a liquid crystal alignment film having good coating film uniformity.

As a result of an extensive study, the present inventors have found that a uniform coating film can be formed regardless of the drying temperature when a liquid crystal alignment film is formed, if a liquid crystal aligning agent is employed which comprises at least one polymer selected from a polyamic acid and a soluble polyimide, and at least two types of specific solvents.

Thus, the present invention provides the following.

(1) A liquid crystal aligning agent comprising at least one polymer selected from the group consisting of a polyamic acid and a soluble polyimide, diethylene glycol diethyl ether, and dipropylene glycol monomethyl ether.

(2) The liquid crystal aligning agent according to the above (1), wherein the concentration of the polymer in the liquid crystal aligning agent is from 2 to 15 wt %.

(3) The liquid crystal aligning agent according to the above (1) or (2), wherein the concentration of diethylene glycol diethyl ether in the liquid crystal aligning agent is from 1 to 70 wt %.

(4) The a liquid crystal aligning agent according to any one of the above (1) to (3), wherein the concentration of dipropylene glycol monomethyl ether in the liquid crystal aligning agent is from 0.1 to 70 wt %.

(5) The liquid crystal aligning agent according to any one of the above (1) to (4), which further contains at least one solvent selected from the group consisting of pyrrolidones and lactones.

(6) The liquid crystal aligning agent according to the above (5), wherein the content of said at least one solvent selected from the group consisting of pyrrolidones and lactones in the liquid crystal aligning agent is from 30 to 90 wt %.

(7) A liquid crystal alignment film obtained by printing the liquid crystal aligning agent as defined in any one of the above (1) to (6), by a flexographic printing method.

BEST MODE FOR CARRYING OUT THE INVENTION

According to the present invention, the liquid crystal aligning agent comprises at least one polymer selected from the group consisting of a polyamic acid and a soluble polyimide, diethylene glycol diethyl ether, and dipropylene glycol monomethyl ether. Here, the polyamic acid to be used in the present invention is a polymer obtained by reacting a diamine with an acid dianhydride, and the soluble polyimide is a solvent-soluble polyimide obtained by subjecting the obtained polyamic acid partially or entirely to cyclodehydration (imidation). The structure is not particularly limited, so long as it is such a polyamic acid or a soluble polyimide.

The following may be mentioned as the diamine compound to be used for synthesizing the polyamic acid.

As an example of an alicyclic diamine, 1,4-diaminocyclohexane, 1,3-diaminocyclohexane, 4,4'-diaminodicyclohexylmethane, 4,4'-diamino-3,3'-dimethyldicyclohexane or isophorone diamine may, for example, be mentioned. Further, as an example of a carbon ring type aromatic diamine, o-phenylenediamine, m-phenylenediamine, p-phenylenediamine, a diaminotoluene (such as 2,4-diaminotoluene), 1,4-diamino-2-methoxybenzene, a diaminoxylene (such as 1,3-diamino-2,4-dimethylbenzene), 1,3-diamino-4-chlorobenzene, 1,4-diamino-2,5-dichlorobenzene, 1,4-diamino-4-isopropylbenzene, 2,2'-bis(4-aminophenyl)propane, 4,4'-diaminodiphenylmethane, 2,2'-diaminostilbene, 4,4'-diaminostilbene, 4,4'-diaminodiphenyl ether, 4,4'-diphenyl thioether, 4,4'-diaminodiphenylsulfone, 3,3'-diaminodiphenylsulfone, 4,4'-diaminobenzoic acid phenyl ester, 4,4'-diaminobenzophenone, 4,4'-diaminobenzyl, bis(4-aminophenyl)phosphine oxide, bis(3-aminophenyl)sulfone, bis(4-aminophenyl)phenylphosphine oxide, bis(4-aminophenyl)

cyclohexylphosphine oxide, N,N-bis(4-aminophenyl)-N-phenylamine, N,N-bis(4-aminephenyl)-N-methylamine, 4,4'-diaminodiphenylurea, 1,8-diaminonaphthalene, 1,5-diaminonaphtanlene, 1,5-diaminoanthraquinone, a diaminofluorene (such as 2,6-diaminofluorene), bis(4-aminophenyl)diethylsilane, bis(4-aminophenyl)dimethylsilane, 3,4'-diaminodiphenyl ether, benzidine, 2,2'-dimethylbenzidine, 2,2-bis[4-(4-aminophenoxy)phenyl]propane, bis[4-(4-aminophenoxy)phenyl]sulfone, 4,4'-bis(aminophenoxy)biphenyl, 2,2-bis[4-(4-aminophenoxy)phenyl]hexafluoropropane, 1,4-bis(4-aminophenoxy)benzene, or 1,3-bis(4-aminophenoxy)benzene, may, for example, be mentioned. Further, as a heterocyclic diamine, 2,6-diaminopyridine, 2,4-diaminopyridine, 2,4-diamino-s-triazine, 2,5-diaminobenzofuran, 2,7-diaminocarbazol, 3,6-diaminocarbazol, 3,7-diaminophenothiazine, 2,5-diamino-1,3,4-thiadiazol, or 2,4-diamino-6-phenyl-s-triazine, may, for example, be mentioned. As an example of an aliphatic diamine, 1,2-diaminoethane, 1,3-diaminopropane, 1,4-diaminobutane, 1,5-diaminopentane, 1,6-diaminohexane, 1,8-diaminooctane, 1,10-diaminodecane, 1,3-diamino-2,2-dimethylpropane, 1,6-diamino-2,5-dimethylhexane, 1,5-diamino-2,4-dimethylheptane, 1,7-diamino-3-methylheptane, 1,9-diamino-5-methylnonane, 2,11-diaminododecane, 1,12-diaminooctadecane, or 1,2-bis(3-aminopropoxy)ethane, may, for example, be mentioned. Further, an aromatic diamine having a long chain alkyl or perfluoro group, represented by the structure of the following formula (1) may, for example, be mentioned.

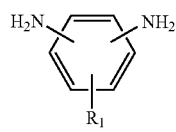

(1)

(wherein $R_1$ represents a long chain alkyl group having at least 5 carbon atoms, preferably from 5 to 20 carbon atoms, or a monovalent organic group containing a long chain alkyl group or a perfluoroalkyl group.)

These diamines may, of course, be used alone or in combination. In order to obtain a high pretilt angle, it is preferred that at least either one of the aromatic diamines having a long chain alkyl or perfluoroalkyl group represented by the formula (1), is contained. Among them, it is particularly preferred that 1,3-diamino-4-(trans-4-heptylcyclohexyl)phenoxybenzene is incorporated, since when such an aligning agent is formed into a liquid crystal alignment film, the film will be excellent in heat resistance.

The acid dianhydride to be used as the material for synthesizing the polyamic acid, may, for example, be an aromatic acid dianhydride such as pyromellitic dianhydride, 3,3'-4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, bis(3,4-dicarboxyphenyl) ether dianhydride, bis(3,4-dicarboxyphenyl)sulfone dianhydride, 1,2,5,6-naphthalenetetracarboxylic dianhydride or 2,3,6,7-naphthalenetetracarboxylic dianhydride. Further, as an alicyclic dianhydride, 1,2,3,4-cyclobutanetetracarboxylic dianhydride, 1,2,3,4-cyclopentanetetracarboxylic dianhydride, 2,3,4,5-tetrahydrofurantetracarboxylic dianhydride, 1,2,4,5-cyclohexanetetracarboxylic dianhydride, 3,4-dicarboxy-1-cyclohexylsuccinic dianhydride, 3,4-dicarboxy-1,2,3,4-tetrahydro-1-naphthalenesuccinic dianhydride, or bicyclo[3,3,0]octane-2,4,6,8-tetracarboxylic dianhydride, may, for example, be mentioned. These acid dianhydrides may be used alone or in combination. However, from the viewpoint of the transparency of the polymer, it is preferred that an alicyclic dianhydride is incorporated. Among them, 1,2,3,4-cyclobutanetetracarboxylic dianhydride is particularly preferred, since when formed into a liquid crystal alignment film, the film will be excellent in the property balance.

The polyamic acid to be used in the present invention can be synthesized by reacting the above-described diamine with the acid dianhydride in the presence of an organic solvent at a temperature of from −20° C. to 150° C., preferably from 0° C. to 80° C., for from 30 minutes to 24 hours, preferably from 1 to 10 hours. The molar ratio of the diamine to the acid dianhydride to be used for the reaction is preferably such that the diamine/the acid dianhydride=0.5 to 3.0/1.0 (molar ratio), more preferably such that the diamine/the acid dianhydride=0.8 to 2.0/1.0 (molar ratio), particularly preferably such that the diamine/the acid dianhydride=1.0 to 1.2/1.0 (molar ratio), since if the diamine is too much, the molecular weight will not increase, or if it is too small, the acid anhydride will remain, and the storage stability tends to be poor.

Further, the solvent to be used for the synthesis of a polyamic acid and its concentration are not particularly limited. However, as the solvent, it is preferred to employ N,N-dimethylformamide, N,N-dimethylacetamide, N-methyl-2-pyrrolidone, N-methylcaprolactam, dimethylsulfoxide, tetramethylurea, pyridine, dimethylsulfoxide or a butyrolactone, since the solubility of the formed polymer will be high. Further, if the concentration during the polymerization of a polyamic acid is too high, the handling efficiency of varnish tends to be poor, and if it is too low, the molecular weight tends to be hardly increased. Accordingly, it is preferably from 1 to 50 wt %, more preferably from 5 to 30 wt %, particularly preferably from 8 to 20 wt %. Further, butyl cellosolve or a poor solvent such as toluene or methanol, may be added within a range where the polymer is soluble.

Further, moisture in the reaction system tends to prevent increase of the molecular weight of the polymer. Accordingly, the reaction system is preferably maintained in a nitrogen atmosphere, and it is more preferred to carry out the reaction while nitrogen is kept bubbling in the solvent in the reaction system.

The viscosity of the polyamic acid to be used in the present invention is preferably from 0.05 to 3.0 dl/g, more preferably from 0.1 to 2.5 dl/g, as a reduced viscosity (as measured in N-methyl-2-pyrrolidone at a temperature of 30° C. at a concentration of 0.5 g/dl), since if it is high, the handling of the liquid crystal aligning agent tends to be difficult, and if it is low, the characteristics when formed into an alignment film, will not be stable.

In the present invention, the polyamic acid obtained as described above, may be used as it is. However, it is preferably entirely or partially cyclodehydrated (imidated) by heating or by a catalyst and is used as a soluble polyimide, since such a polyimide is excellent in storage stability. As a method for the imidation reaction to convert the polyamic acid to a soluble polyimide, there may be mentioned thermal imidation wherein the solution of the polyamic acid is heated as it is, or chemical imidation wherein a catalyst is added to the solution of the polyamic acid to carry out the imidation. Among them, the chemical imidation wherein the imidation reaction proceeds at a relatively low temperature, is preferred, since decease in the molecular weight of the polyimide to be obtained, is less likely to occur.

The chemical imidation reaction is preferably carried out by reacting the polyamic acid in an organic solvent in the presence of a basic catalyst in an amount of from 0.5 to 30 mols, preferably from 1 to 20 mols, per mol of the amic acid groups, and an acid anhydride in an amount of from 0.5 to 50 mols, preferably from 1 to 30 mols, per mol of the amic acid groups, at a temperature of from −20 to 250° C., preferably from 0 to 200° C., for from 1 to 100 hours. If the amount of the basic catalyst or the acid anhydride is small, the reaction will not sufficiently proceed, and if it is too large, it tends to be difficult to completely remove it after completion of the reaction. As the basic catalyst to be used here, pyridine, triethylamine, trimethylamine, tributylamine or trioctylamine may, for example, be mentioned. Among them, pyridine is preferred, since it has a basicity suitable to let the reaction proceed. Further, as the acid anhydride, acetic anhydride, trimellitic anhydride or pyromellitic anhydride may, for example, be mentioned. Among them, it is preferred to employ acetic anhydride, whereby purification after the completion of the reaction, will be easy. As the organic solvent for the imidation reaction, it is possible to employ the above-mentioned solvent to be used for the synthesis of the polyamic acid. The imidation rate by the chemical imidation may be controlled by adjusting the amount of the catalyst and the reaction temperature. However, if the imidation rate is too low, the storage stability when formed into a liquid crystal aligning agent, tends to be poor, and if it is too high, the solubility tends to be poor, and it may precipitate. Accordingly, it is preferably from 0.1 to 99%, more preferably from 5 to 90%, particularly preferably from 30 to 70%, of the mols of all polyamic acids.

The polyamic acid or the soluble polyimide obtained as described above, may be purified by pouring it into a poor solvent with thorough stirring, for re-precipitation. The poor solvent to be used here is not particularly limited, and methanol, acetone, hexane, butyl cellosolve, heptane, methyl ethyl ketone, methyl isobutyl ketone, ethanol, toluene or benzene may, for example, be mentioned. The polyamic acid or the soluble polyimide obtained by re-precipitation, may be filtered and recovered, and then dried under atmospheric pressure or reduced pressure at room temperature or under heating, to obtain a powder. The powder of the polyamic acid or the soluble polyimide, thus obtained, may be dissolved again in a solvent containing a good solvent to obtain a varnish.

The liquid crystal aligning agent of the present invention is required to comprise at least one polymer selected from the group consisting of the polyamic acid and the soluble polyimide obtained by the above described methods, diethylene glycol diethyl ether, and dipropylene glycol monomethyl ether. The method and the order of mixing these components of the liquid crystal aligning agent are not particularly limited. However, it is preferred that the polymer component is dissolved in a good solvent and then diethylene glycol diethyl ether and dipropylene glycol monomethyl ether are gradually added, whereby dissolution of the polymer is fast, and the operation efficiency will be good. Further, at the time of dissolving the polyamic acid or the soluble polyimide in a good solvent, stirring is carried out at a temperature of from 0 to 150° C., preferably from room temperature to 100° C. for from 1 to 100 hours, whereby a uniform solution can be obtained.

The good solvent to be used for dissolving the polyamic acid or the soluble polyimide for the liquid crystal aligning agent of the present invention, is not particularly limited. Specifically, N,N-dimethylformamide, N,N-dimethylacetamide, N-methyl-2-pyrrolidone, N-methylcaprolactam, dimethylsulfoxide or γ-butyrolactone, may, for example, be mentioned. Such a solvent is contained preferably in an amount of from 30 to 90 wt %, particularly preferably from 50 to 80 wt %, in the liquid crystal aligning agent of the present invention.

At least one type selected from the group consisting of pyrrolidones and lactones is preferably contained as such a solvent, whereby the solubility of the polymer will be high, and it is particularly preferred that both a pyrrolidone and a lactone are contained, whereby wettability will be good when the liquid crystal aligning agent is applied, and hygroscopicity of the coating liquid can be suppressed. As such a pyrrolidone, N-methyl-2-pyrrolidone is preferred, and as such a lactone, γ-butyrolactone is preferred.

The concentration of the polymer such as the polyamic acid or the soluble polyimide in the liquid crystal aligning agent of the present invention is preferably from 2 to 15 wt %, more preferably from 3 to 8 wt %, since if it is too high, adjustment of the film thickness when it is applied on a substrate to form a liquid crystal alignment film, and if it is too low, no adequate film thickness tends to be obtained when it is formed into a liquid crystal alignment film.

The liquid crystal aligning agent of the present invention is required to further contain two types of solvents i.e. diethylene glycol diethyl ether and dipropylene glycol monomethyl ether in order to obtain a uniform coating film even when the drying temperature changes. If the amount of diethylene glycol diethyl ether is too small, the uniformity of the coating film when formed into a liquid crystal alignment film tends to deteriorate, and if it is too much, the polyamic acid or the soluble polyimide tends to precipitate. Accordingly, it is preferably from 0.1 to 70 wt %, more preferably from 1 to 50 wt %, particularly preferably from 5 to 40 wt %, based on the entire amount of the liquid crystal aligning agent. Further, also the propylene glycol monomethyl ether is preferably from 0.1 to 70 wt %, more preferably from 1 to 50 wt %, particularly preferably from 5 to 40 wt %, since if it is too small, the uniformity of the coating film tends to deteriorate when formed into a liquid crystal alignment film, and if it is too much, the polyamic acid or the soluble polyimide tends to precipitate.

Further, various additives such as a cross-linking agent and a coupling agent, may further be added to the liquid crystal aligning agent.

The liquid crystal aligning agent thus obtained can be used to form a liquid crystal alignment film by applying it on a substrate after filtration. As a method for applying it on a substrate, a spin coating method, a flexographic printing method, or an ink jet method may, for example, be mentioned. Among them, the flexographic printing method is preferred, since the uniformity of a coating film thereby formed will be excellent, and it is easy to increase the size. The substrate to be used is not particularly limited so long as it is a substrate having high transparency, and a glass substrate or a plastic substrate such as an acrylic substrate or a polycarbonate substrate may, for example, be employed. Further, needless to say, it is preferred to employ a substrate having ITO electrodes formed to drive the liquid crystal, from the viewpoint of simplicity of the process.

The liquid crystal aligning agent of the present invention is preferably applied uniformly on the substrate in order to increase the uniformity of the coating film, followed by preliminary drying preferably at a temperature of from room temperature to 200° C., more preferably from 30 to 150° C., sill more preferably from 50 to 120° C., for from 1 to 100 minutes. It is thereby possible to adjust the volatility of each component of the liquid crystal aligning agent and to form a uniform coating film free from irregularity. Thereafter, baking is further carried out at a temperature of from 100 to 300° C., preferably from 150 to 260° C., for from 10 to 30 minutes, whereby the solvent component can be completely evaporated to form a liquid crystal alignment film. The liquid crystal alignment film thus formed is used for a liquid crystal display device after monoaxial alignment treatment by rubbing or irradiation with polarized ultraviolet rays, or without such monoaxial alignment treatment in a certain application to e.g. a vertical alignment film.

The liquid alignment film thus prepared by the present invention has high uniformity, whereby a liquid crystal display device can be prepared in good yield even when a large size substrate is employed.

Now, the present invention will be described in further detail with reference to Examples, but it should be understood that the present invention is by no means restricted thereto.

EXAMPLES

Preparation Example 1

In a nitrogen atmosphere, in a 500 ml four necked flask, 1.42 g (0.03 mol) of 1,3-diamino-4-(trans-4-heptylcyclohexyl)phenoxybenzene and 7.57 g (0.07 mol) of p-phenylenediamine were dissolved in 170 g of N-methyl-2-pyrrolidone (hereinafter referred to simply as NMP). Then, 4.90 g (0.075 mol) of 1,2,3,4-cyclobuthanetetracarboxylic dianhydride and 18.77 g (0.025 mol) of bicyclo[3,3,0]octane-2,4,6,8-tetracarboxylic dianhydride were added, followed by polymerization at room temperature for 5 hours to obtain a polyamic acid solution.

100.0 g of this polyamic acid solution was put into a 300 ml four-necked flask, and as an imidation catalyst, 21.0 g of acetic anhydride and 16.3 g of pyridine were added, followed by a reaction at 90° C. for two hours to obtain a soluble polyimide solution. This solution was poured into 2,400 ml of methanol, and an obtained white precipitate was collected by filtration and dried to obtain a white polyimide powder (PI). The obtained polyimide powder was confirmed by NMR to be imidized 50%.

Preparation Example 2

In a nitrogen atmosphere, in a 500 ml four-necked flask, 11.42 g (0.03 mol) of 1,3-diamino-4-(trans-4-heptylcyclohexyl)phenoxybenzene and 7.57 g (0.07 mol) of p-phenylenediamine were dissolved in 170 g of NMP. Then, 4.90 g (0.075 mol) of 1,2,3,4-cyclobuthanetetracarboxylic dianhydride and 18.77 g (0.025 mol) of bicyclo[3,3,0] octane-2,4,6,8-tetracarboxylic dianhydride were added, followed by polymerization at room temperature for 5 hours, to obtain a polyamic acid solution. This solution was put into 1,000 ml of methanol, and an obtained white precipitate was collected by filtration and dried to obtain a white polyamic acid powder (PAA).

Example 1

Into a 100 ml eggplant type flask, 2.75 g of the polyimide powder obtained in Preparation Example 1, 5.50 g of NMP and 19.25 g of γ-butyrolactone (hereinafter referred to simply as BL) were added and dissolved with stirring at 70° C. for 24 hours. The obtained dissolved solution was then diluted with 3.75 g of NMP, 5.75 g of BL, 6.50 g of dipropylene glycol monomethyl ether (hereinafter referred to simply as DPM) and 6.50 g of diethylene glycol diethyl ether (hereinafter referred to simply as DEDE) to obtain a liquid crystal aligning agent.

This liquid crystal aligning agent was printed on cleaned glass substrates provided with ITO electrodes by flexographic printing by means of an alignment film-printing machine ("ANGSTROMER" manufactured by Nissha Printing Co., Ltd.). The substrates after the printing were left on hotplates of 50° C., 65° C. and 80° C., respectively, for five minutes to carry out preliminary drying of the coating films.

The film surfaces after the preliminary drying were visually inspected, whereby it was found that at each preliminary drying temperature, no irregularity due to a change in the coating film thickness was observed, and a uniform coating film was formed. Further, such substrates were baked in an oven of 200° C. for 60 minutes to obtain substrates provided with liquid crystal alignment films. These liquid crystal alignment films had no irregularity due to a change in the film thickness, and at each preliminary drying temperature, a uniform liquid crystal alignment film was obtained.

Example 2

Into a 100 ml eggplant type flask, 3.00 g of the polyimide powder obtained in Preparation Example 1, 6.00 g of NMP and 21.00 g of BL were added and dissolved with stirring at 70° C. for 24 hours. The obtained dissolved solution was then diluted with 3.00 g of NMP, 4.00 g of BL, 5.00 g of DPM and 8.00 g of DEDE to obtain a liquid crystal aligning agent.

This liquid crystal aligning agent was printed on substrates, preliminarily dried and then inspected, in the same manner as in Example 1. As a result, at each preliminary drying temperature, no irregularity due to a change in the coating film thickness was observed, and a uniform coating film was formed. Further, the liquid crystal alignment films obtained by baking in the same manner as in Example 1, had no irregularity due to a change in the film thickness, and at each preliminary drying temperature, it was possible to obtain a uniform liquid crystal alignment film.

Example 3

Into a 100 ml eggplant type flask, 3.25 g of the polyimide powder obtained in Preparation Example 1, 6.50 g of NMP and 22.75 g of BL were added and dissolved with stirring at 70° C. for 24 hours. The obtained dissolved solution was then diluted with 2.25 g of NMP, 6.25 g of BL, 3.00 g of DPM and 6.00 g of DEDE to obtain a liquid crystal aligning agent.

This liquid crystal aligning agent was printed on substrates, preliminarily dried and then inspected in the same manner as in Example 1. As a result, at each preliminary drying temperature, no irregularity due to a change in the coating film thickness was observed, and a uniform coating film was formed. Further, the liquid crystal alignment films obtained by baking in the same manner as in Example 1, had no irregularity due to a change in the film thickness, and at each preliminary drying temperature, it was possible to obtain a uniform liquid crystal alignment film.

Example 4

Into a 100 ml eggplant type flask, 3.25 g of the polyamic acid powder obtained in Preparation Example 2, 8.75 g of NMP and 25.00 g of BL were added and dissolved with stirring at room temperature for 24 hours. The obtained dissolved solution was then diluted with 6.50 g of DPM and 6.50 g of DEDE to obtain a liquid crystal aligning agent.

This liquid crystal aligning agent was printed, preliminarily dried and then inspected in the same manner as in Example 1. As a result, at each preliminary drying temperature, no irregularity due to a change in the coating film thickness was observed, and a uniform coating film was formed. Further, the liquid crystal alignment films obtained by baking in the same manner as in Example 1 had no irregularity due to a change in the film thickness, and at each preliminary drying temperature, it was possible to obtain a uniform liquid crystal alignment film.

Example 5

Into a 100 ml eggplant type flask, 2.75 g of the polyimide powder obtained in Preparation Example 1 and 24.75 g of NMP were added and dissolved with stirring at 70° C. for 24 hours. The obtained dissolved solution was then diluted with 9.50 g of NMP, 6.50 g of DPM and 6.50 g of DEDE to obtain a liquid crystal aligning agent.

This liquid crystal aligning agent was printed on substrates, preliminarily dried and then inspected in the same manner as in Example 1. As a result, at each preliminary drying temperature, no irregularity due to a change in the coating film thickness was observed, and a uniform coating film was formed. Further, the liquid crystal alignment films obtained by baking in the same manner as in Example 1 had no irregularity due to a change in the film thickness, and at each preliminary drying temperature, it was possible to obtain a uniform liquid crystal alignment film.

Comparative Example 1

Into a 100 ml eggplant type flask, 2.75 g of the polyimide powder obtained in Preparation Example 1, 5.50 g of NMP and 19.25 g of BL were added and dissolved with stirring at 70° C. for 24 hours. The obtained dissolved solution was then diluted with 3.75 g of NMP, 5.75 g of BL and 13.00 g of DPM to obtain a liquid crystal aligning agent.

This liquid crystal aligning agent was printed on substrates, preliminarily dried and inspected in the same manner as in Example 1. As a result, in cases where preliminary drying was carried out at 50° C. and 65° C., irregularities due to a change in the film thickness were observed, and it was not possible to obtain uniform coating films. Further, also with the liquid crystal alignment films obtained by baking in the same manner as in Example 1, the irregularities due to a change in the film thickness were not eliminated, and in a case where the preliminary drying temperature was low, it was impossible to obtain a uniform liquid crystal alignment film.

Comparative Example 2

Into a 100 ml eggplant type flask, 2.75 g of the polyimide powder obtained in Preparation Example 1, 5.50 g of NMP and 19.25 g of BL were added and dissolved with stirring at 70° C. for 24 hours. The obtained dissolved solution was then diluted with 3.75 g of NMP, 5.75 g of BL and 13.00 g of DEDE to obtain a liquid crystal aligning agent.

This liquid crystal aligning agent was printed on substrates, preliminarily dried and inspected in the same manner as in Example 1. As a result, in cases where preliminary drying was carried out at 50° C. and 65° C., irregularities due to a change in the film thickness were observed, and it was impossible to obtain a uniform coating film. Further, also with the liquid crystal alignment films obtained by baking in the same manner as in Example 1, the irregularities due to a change in the film thickness were not eliminated, and in a case where the preliminary drying temperature was low, it was impossible to obtain a uniform liquid crystal alignment film.

TABLE 1

| | Polymer | Solvents | Ratio (wt %) | Other solvents | Drying temperature/ uniformity of coating film | | |
|---|---|---|---|---|---|---|---|
| | | | | | 50° C. | 65° C. | 80° C. |
| Ex. 1 | PI | DPM/DEDE | 13/13 | NMP/BL | Good | Good | Good |
| Ex. 2 | PI | DPM/DEDE | 10/16 | NMP/BL | Good | Good | Good |
| Ex. 3 | PI | DPM/DEDE | 6/12 | NMP/BL | Good | Good | Good |
| Ex. 4 | PAA | DPM/DEDE | 13/13 | NMP/BL | Good | Good | Good |
| Ex. 5 | PI | DPM/DEDE | 13/13 | NMP | Good | Good | Good |
| Comp. Ex. 1 | PI | DPM | 26 | NMP/BL | Irregular | Irregular | Good |
| Comp. Ex. 2 | PI | DEDE | 26 | NMP/BL | Irregular | Irregular | Good |

INDUSTRIAL APPLICABILITY

By the liquid crystal aligning agent of the present invention, it becomes possible to form a uniform coating film even when the temperature for preliminary drying is low, whereby it will be possible to reduce the energy cost, improve the process margin and improve the yield. Further, the formed liquid crystal alignment film has high uniformity, and particularly when a large size liquid crystal display device is prepared, it is possible to display a good image free from irregularity.

The invention claimed is:

1. A liquid crystal aligning agent, comprising:
   (i) at least one polymer selected from the group consisting of a polyamic acid and a soluble polyimide,
   (ii) diethylene glycol diethyl ether, and
   (iii) dipropylene glycol monomethyl ether.

2. The liquid crystal aligning agent according to claim 1, wherein the concentration of the polymer in the liquid crystal aligning agent is from 2 to 15 wt% based on the total weight of the liquid crystal aligning agent.

3. The liquid crystal aligning agent according to claim 1, wherein the concentration of diethylene glycol diethyl ether in the liquid crystal aligning agent is from 1 to 70 wt% based on the total weight of the liquid crystal aligning agent.

4. The a liquid crystal aligning agent according to claim 1, wherein the concentration of dipropylene glycol monomethyl ether in the liquid crystal aligning agent is from 0.1 to 70 wt% based on the total weight of the liquid crystal aligning agent.

5. The liquid crystal aligning agent according to claim 1, which further contains at least one solvent selected from the group consisting of pyrrolidones and lactones.

6. The liquid crystal aligning agent according to claim 5, wherein the content of said at least one solvent selected from the group consisting of pyrrolidones and lactones present in the liquid crystal aligning agent is from 30 to 90 wt% based on the total weight of the liquid crystal aligning agent.

7. A liquid crystal alignment film obtained by printing the liquid crystal aligning agent as defined in claim 1, by a flexographic printing method.

8. A liquid crystal display device, comprising:
a liquid crystal alignment film comprising a substrate and the liquid crystal aligning agent of claim 1 present on the substrate in the form of a film.

9. The liquid crystal aligning agent of claim 1, comprising a polyamic acid polymer obtained by reacting a diamine with an acid dianhydride.

10. The liquid crystal aligning agent of claim 9, wherein the diamine comprises 1,3-diamino-4-(trans-4-heptylcyclohexyl)phenoxybenzene.

11. The liquid crystal aligning agent of claim 9, wherein the acid dianhydride is 1,2,3,4-cyclobutanetetracarboxylic dianhydride.

12. The liquid crystal aligning agent of claim 1, comprising a polyimide polymer obtained by cyclodehydrating a polyamic acid polymer.

13. The liquid crystal aligning agent of claim 1, wherein the diethylene glycol diethyl ether and the dipropylene glycol monomethyl ether are present in amounts effective to form a uniform coating film in a liquid crystal alignment film.

14. The liquid crystal aligning agent of claim 1, wherein the diethylene glycol diethyl ether is present in an amount of from 0.1 to 70 wt%, and the propylene glycol monomethyl ether is present in an amount of from 0.1 to 70 wt%, wherein wt% is based on the total weight of the liquid crystal aligning agent.

15. The liquid crystal aligning agent of claim 1, wherein the polymer is present in an amount of from 2 to 15 wt%, the diethylene glycol diethyl ether is present in an amount of from 5 to 40 wt%, and the propylene glycol monomethyl ether is present in an amount of from 5 to 40 wt%, wherein wt% is based on the total weight of the liquid crystal aligning agent.

16. The liquid crystal aligning agent of claim 15, further comprising at least one solvent selected from the group consisting of a pyrrolidone and a lactone, wherein the solvent is present in an amount of from 50 to 80 wt%.

17. A method for making a liquid crystal aligning film, comprising:
applying the liquid crystal aligning agent of claim 1 on a substrate, and drying the substrate after the liquid crystal aligning agent has been applied thereto.

18. The liquid crystal aligning agent of claim 1, comprising at least one polymer obtained by reacting at least one diamine selected from the group consisting of 1,3-diamino-4-(trans-4-heptylcyclohexyl)phenoxybenzene and p-phenylene diamine, and at least one dianhydride selected from the group consisting of 1,2,3,4-cyclobutanetetracarboxylic acid dianhydride and bicyclo[3,3,O]octane-2,4,6,8-tetracarboxylic dianhydride.

19. The liquid crystal aligning agent of claim 18, wherein the polymer formed by the reaction of the diamine and the dianhydride is further subjected to cyclodehydration to form a polyimide polymer.

20. The liquid crystal aligning agent of claim 1, wherein the diethylene glycol diethyl ether is present in an amount of from 13 to 16 wt% and the dipropylene glycol monomethyl ether is present in an amount of from 6 to 13 wt%.

21. The liquid crystal aligning agent of claim 9, wherein the diamine comprises at least one selected from the group consisting of 1,4-diaminocyclohexane, 1,3-diaminocyclohexane, 4,4'-diaminodicyclohexylmethane, 4,4'-diamino-3,3'-dimethyldicyclohexane, and isophorone diamine.

* * * * *